US012790954B2

(12) United States Patent
Baxter et al.

(10) Patent No.: US 12,790,954 B2
(45) Date of Patent: Nov. 10, 2026

(54) SENSIBLE HEAT EXCHANGER AND DRYER

(71) Applicant: Sustainable Energy Solutions, Inc., Ball Ground, GA (US)

(72) Inventors: Larry Baxter, Orem, UT (US); David Frankman, Provo, UT (US); Skyler Chamberlain, Provo, UT (US)

(73) Assignee: Sustainable Energy Solutions, Inc., Ball Ground, GA (US)

( * ) Notice: Subject to any disclaimer, the term of this patent is extended or adjusted under 35 U.S.C. 154(b) by 236 days.

(21) Appl. No.: 18/423,566

(22) Filed: Jan. 26, 2024

(65) Prior Publication Data

US 2024/0252979 A1 Aug. 1, 2024

Related U.S. Application Data

(60) Provisional application No. 63/481,916, filed on Jan. 27, 2023.

(51) Int. Cl.
*B01D 53/02* (2006.01)
*B01D 3/40* (2006.01)
(Continued)

(52) U.S. Cl.
CPC ............... *F01D 15/10* (2013.01); *B01D 3/40* (2013.01); *B01D 53/002* (2013.01);
(Continued)

(58) Field of Classification Search
CPC ...... B01D 2252/102; B01D 2252/2021; B01D 2252/204; B01D 2257/504;
(Continued)

(56) References Cited

U.S. PATENT DOCUMENTS 8,051,901 B2 * 11/2011 Schonberger ............ F25J 5/002 165/157
8,425,655 B2 * 4/2013 Chen .................. B01D 19/0005 95/227

(Continued)

FOREIGN PATENT DOCUMENTS

CN 101053809 A 10/2007
CN 106931807 A 7/2017
CN 206934982 U 1/2018

OTHER PUBLICATIONS

International Search Report and Written Opinion, counterpart International App. No. PCT/US2024/013152 (Oct. 28, 2024) (17 pages).

*Primary Examiner* — Christopher P Jones
(74) *Attorney, Agent, or Firm* — Edell, Shapiro & Finnan, LLC

(57) ABSTRACT

Systems and methods for separation of a component from a mixed gas stream by a combination of direct contact heat and material exchange in an indirect contact heat exchanger are disclosed. A contact liquid stream wets an interior surface of the process channel of the indirect contact heat exchanger and the mixed gas stream passes through the process channel, contacting the contact liquid stream for heat and mass exchange. A refrigerant in the refrigerant channel of the indirect contact heat exchanger and a depleted gas stream in a depleted gas stream channel are used for heat exchange with the contact liquid.

20 Claims, 4 Drawing Sheets

(51) Int. Cl.

| | |
|---|---|
| ***B01D 53/00*** | (2006.01) |
| ***B01D 53/14*** | (2006.01) |
| ***B01D 53/18*** | (2006.01) |
| ***B01D 53/26*** | (2006.01) |
| ***B01D 53/30*** | (2006.01) |
| ***F01D 15/10*** | (2006.01) |
| ***F25J 3/06*** | (2006.01) |

(52) U.S. Cl.
CPC ....... *B01D 53/1406* (2013.01); *B01D 53/145* (2013.01); *B01D 53/1475* (2013.01); *B01D 53/1493* (2013.01); *B01D 53/18* (2013.01); *B01D 53/263* (2013.01); *B01D 53/265* (2013.01); *B01D 53/30* (2013.01); *F25J 3/062* (2013.01); *B01D 2252/102* (2013.01); *B01D 2252/2021* (2013.01); *B01D 2252/204* (2013.01); *B01D 2257/504* (2013.01); *B01D 2257/80* (2013.01); *B01D 2258/0283* (2013.01); *F05D 2260/20* (2013.01)

(58) Field of Classification Search
CPC ........ B01D 2257/80; B01D 2258/0283; B01D 3/40; B01D 51/10; B01D 53/002; B01D 53/1406; B01D 53/1418; B01D 53/145; B01D 53/1475; B01D 53/1493; B01D 53/18; B01D 53/263; B01D 53/265; B01D 53/30; F01D 15/10; F05D 2260/20; F23J 15/06; F23J 2215/50; F25J 2220/82; F25J 2230/30; F25J 2240/90; F25J 2260/02; F25J 3/0266; F25J 3/062; Y02C 20/40
See application file for complete search history.

(56) References Cited

U.S. PATENT DOCUMENTS

| | | | | |
|---|---|---|---|---|
| 9,248,397 | B2 | 2/2016 | Oohashi et al. | |
| 9,545,595 | B2 * | 1/2017 | Find | B01D 53/1475 |
| 10,753,624 | B2 * | 8/2020 | Vandermeulen | B01D 53/263 |
| 2015/0233589 | A1 * | 8/2015 | Betts | B01D 61/363 202/180 |
| 2020/0078730 | A1 * | 3/2020 | Melin | B01D 53/75 |
| 2020/0346163 | A1 * | 11/2020 | Benali | B01D 53/1456 |
| 2023/0135067 | A1 * | 5/2023 | Woods | F24F 13/30 62/271 |
| 2024/0255221 | A1 * | 8/2024 | Baxter | B01D 53/263 |

* cited by examiner

SENSIBLE HEAT EXCHANGER AND DRYER

CLAIM OF PRIORITY

This application claims the benefit of U.S. Provisional Patent Application No. 63/481,916, filed Jan. 27, 2023, the contents of which are hereby incorporated by reference.

FIELD OF DISCLOSURE

The methods and processes described herein relate generally to processing of gas streams using heat and mass exchange. More particularly, the methods and processes described herein relate to use of a combination of indirect contact heat exchange and direct contact heat and mass exchange to remove a vapor component from a mixed gas stream.

BACKGROUND

The removal of water, carbon dioxide, other acid gases, and contaminants from flue gas, syngas, and other gas streams can be accomplished by a variety of methods such as by condensation followed by distillation. These methods can have limitations, including high energy requirements, inefficiencies, and expense. Vapor removal from a gas stream is important and improved devices, methods, and systems could be beneficial.

SUMMARY

There are several aspects of the present subject matter which may be embodied separately or together in the methods, devices, and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In a first aspect, the disclosure provides a method for removing a first component from a mixed gas stream. A refrigerant stream is passed through a first channel of an indirect contact heat exchanger. A depleted gas stream is passed through a second channel of the indirect contact heat exchanger. A contact liquid stream is passed through a third channel of the indirect contact heat exchanger such that the contact liquid stream wets a first interior wall and a second interior wall of the third channel. The first interior wall separates the first channel from the third channel and the second interior wall separates the second channel from the third channel. The mixed gas stream is passed through a center of the second channel such that the gas stream and the contact liquid stream engage in heat and mass exchange. The contact liquid stream receives a heat stream from the mixed gas stream, transmits a first portion of the heat stream through the first interior wall into the refrigerant stream, transmits a second portion of the heat stream through the second interior wall into the depleted gas stream, and leaves the third channel while retaining a balance of the heat stream. The first component condenses from the mixed gas stream into the contact liquid stream, resulting in a depleted gas stream and an enriched contact liquid stream.

In a second aspect, the disclosure provides a system for removing a first component from a mixed gas stream. An indirect contact heat exchanger includes a process channel, one or more refrigerant channels, and one or more depleted gas stream channels. The process channel shares a first interior wall with the one or more refrigerant channels and a second interior wall with the one or more depleted gas stream channels. The process channel is configured to receive a contact liquid stream through an inlet of the process channel and wet inner surfaces of the first interior wall and the second interior wall of the process channel with the contact liquid stream while leaving a gas space inside the process channel. The process channel is further configured to receive the mixed gas stream through the inlet of the process channel and pass the mixed gas stream through the gas space. The one or more refrigerant channels are configured to each receive one of a group of refrigerant streams from one or more refrigerant controllers. One or more instruments are situated at least on an inlet of the process channel, an outlet of the process channel, or both. The one or more instruments are configured to measure one or more process variables of the process channel and transmit the one or more process variables to a main controller. The main controller is programmed to receive the one or more process variables and send a signal to each of the one or more refrigerant controllers. The one or more refrigerant controllers are configured to control a flow rate of one of the group of refrigerant streams to each of the one or more refrigerant channels to maintain the one or more process variables in the contact liquid stream at a setpoint. The contact liquid stream receives a heat stream from the mixed gas stream, transmits a first portion of the heat stream to each of the one of the group of refrigerant streams in each of the one or more refrigerant channels, transmits a second portion of the heat stream to the depleted gas stream channels, and leaves the process channel while retaining a balance of the heat stream. The first component condenses from the mixed gas stream into the contact liquid stream.

Further aspects and embodiments are provided in the foregoing drawings, detailed description and claims.

BRIEF DESCRIPTION OF DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
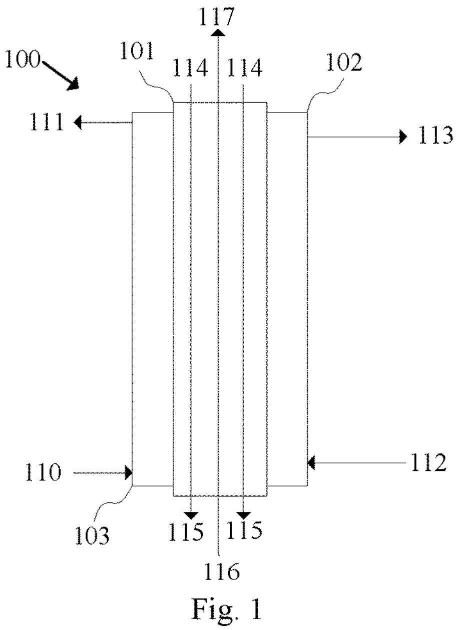
FIG. 1 is a process diagram showing a method for separating a component from a gas stream.

While the subject matter of the present disclosure is susceptible to embodiments in various forms, there will hereinafter be described presently preferred embodiments with the understanding that the present disclosure is to be considered an exemplification and is not intended to limit the disclosure to the specific embodiments illustrated. The words "a" or "an" are to be taken to include both the singular and the plural. Conversely, any reference to plural items shall, where appropriate, include the singular.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "condensing" is meant to refer to the process of a vapor being cooled to a liquid. As used herein, "desublimating" is meant to refer to the process of a vapor being cooled to a solid. As used herein, "cryogenic" is intended to refer to temperatures below about −58° F. (−50° C.).

As used herein, "dried" is meant to refer to a gas or liquid stream that has had water removed, such as when flue gas is dried to remove water vapor, resulting in a dried flue gas stream.

As used herein, "depleted" is meant to refer to a gas or liquid stream that has had a component removed, such as carbon dioxide. A flue gas stream that has had carbon dioxide removed is a depleted flue gas stream.

As used herein, "wet" is meant to refer to a gas or liquid stream that has had water added, such as when a contact liquid captures water and becomes a wet contact liquid.

As used herein, "enriched" is meant to refer to a gas or liquid stream that has had a component added, such as when a contact liquid captures carbon dioxide and becomes an enriched contact liquid.

Combustion flue gas consists of the exhaust gas from a fireplace, oven, furnace, boiler, steam generator, or other combustor. The combustion fuel sources include coal, hydrocarbons, and bio-mass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases. Dried combustion flue gas has had the water removed.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

Refinery off-gases comprise gases produced by refining precious metals, such as gold and silver. These off-gases tend to contain significant amounts of mercury and other metals.

Mixed gas streams, such as flue gas, syngas, producer gas, and refinery off gases, tend to contain moisture in varying amounts. With the recent push for carbon dioxide sequestration, moisture removal is generally critical before carbon dioxide removal can be attempted. Without water removal, the typically cryogenic temperatures of carbon dioxide sequestration can result in ice blocking the unit operations. Methods for water removal are extremely varied, including distillation, ice making, and even desiccation. All of these methods are either extremely energy intensive, require batch operations, or are extraordinarily expensive. Embodiments of the disclosure overcome at least some of these and other issues that will be apparent to a person of skill in the art.

A combination of indirect contact heat exchange and direct contact heat and mass exchange is utilized to remove a vapor component, such as water, from a mixed gas stream, such as flue gas. The water/flue gas example will be used to summarize this method, but a person of skill in the art could use this method for removal of a variety of vapor components from a variety of mixed gas streams. The indirect contact heat exchanger has a refrigerant channel that carries a refrigerant stream and a depleted gas channel to carry a depleted flue gas stream, both of which extract heat from a contact liquid stream that is carried in a process channel of the same indirect contact heat exchanger. The process channel carries the contact liquid in a quantity that wets the inner surfaces of the process channel. The flue gas stream passes through the balance of the volume of the process channel. In a preferred embodiment, the contact liquid stream wets the inner surfaces of the process channel which results in the flue gas stream rarely contacting the inner surfaces. In a more preferred embodiment, the contact liquid stream entirely prevents the flue gas stream from contacting the inner surfaces. The flue gas stream passes through the process channel with water as a component. As the flue gas passes across the contact liquid, the moisture condenses out of the flue gas into the contact liquid. In a preferred embodiment, the heat from the flue gas stream that is passed into the contact liquid stream (from lowering the temperature of the flue gas stream and from condensing the water vapor) is removed from the contact liquid stream by the depleted gas stream and by the refrigerant.

In one embodiment, the depleted gas stream is a dry flue gas stream, such as that produced by this invention. In another embodiment, the depleted gas stream is a dry, depleted flue gas stream that had both water and carbon dioxide removed.

In embodiments of the disclosure, the amount of contact liquid required is minimized—only enough to coat the surfaces of the process channel. This is because there is always some amount of carbon dioxide that dissolves out of the flue gas into the contact liquid. By minimizing this volume, the amount of carbon dioxide becomes trivial in regenerating the contact liquid. The water removal step where large volumes of contact liquid are processed can produce large amounts of carbon dioxide that desublimate out, clogging exchangers and vessels. Embodiments of the disclosure provide a liquid to condense out the water from the flue gas, but not enough to remove a significant amount of caron dioxide. Further, by minimizing the contact liquid, the amount of carbon dioxide that can condense into the contact liquid at the inlet of the flue gas and vaporize out of the contact liquid at the outlet of the contact liquid is minimized, limiting disruptions to the temperature profile of the contact liquid.

In one embodiment, the contact liquid stream enters at a lower temperature and leaves at a higher temperature. In a preferred embodiment, the contact liquid stream is isothermal across the entire channel.

FIG. 1 is a process diagram showing a method for separating a component from a gas stream that may be used in one embodiment of the present invention. The number of channels and fluid streams illustrated in this embodiment, and the following embodiments, is non-limiting in that alternative numbers of each may be used. This is referred to as a cooler-dryer exchange process. A process channel 101, a refrigerant channel 102, and a depleted gas channel 103 make up an indirect contact heat exchanger 100. A refrigerant stream 112 enters and passes up the refrigerant channel 102. A first depleted gas stream 110 enters and passes up the depleted gas channel 103. A contact liquid stream 114 enters and passes down the process channel 101. The contact liquid stream 114 is of sufficient volumetric flow to wet the surface of the process channel 101 but not to fill the entire process channel 101. As a result, the contact liquid stream has a hollow concentric rectilinear or annular flow profile. The contact liquid 114 preferably wets but does not soak into or adhere to the surface(s) of the process channel 101. The liquid preferably flows easily in a sheet that covers the surface(s) so that beading is avoided. As examples only, the surface(s) may have the same polarity as liquid, oxidized layering, increased surface roughness, anodization, coatings, etching and/or adding surfactants. This applies to the process channels in the following embodiments as well.

A mixed gas stream 116 passes up the balance of the volume of the process channel 101. Heat and mass exchange occurs between the mixed gas stream 116 and the contact liquid stream 114. For mass exchange, the first component from the mixed gas stream 116 condenses into the contact liquid stream 114. For heat exchange, in a most preferred embodiment, a heat stream is transferred from the mixed gas stream 116 into the contact liquid stream 114 and the same amount of heat is transferred from the contact liquid stream 114 into the refrigerant stream 112 and the depleted gas stream 110, resulting in the contact liquid stream 114 staying isothermal across the entire process channel 101. The heat and mass exchange results in a second depleted gas stream 117, an enriched contact liquid stream 115, a warmed refrigerant stream 113, and a warmed depleted gas stream 111. In one embodiment, the first depleted gas stream 110 is sourced from the second depleted gas stream 117. In an alternative to this embodiment, the contact liquid stream is not isothermal.

Figure 2:
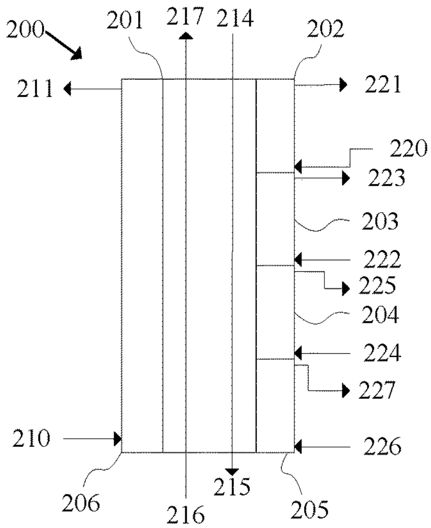
FIG. 2 is a process diagram showing a method for separating a component from a gas stream.

FIG. 2 is a process diagram showing a method for separating water vapor from a flue gas stream that may be used in one embodiment of the present invention. This is referred to as a cooler-dryer exchange process. A process channel 201, a series of refrigerant channels 202, 203, 204, and 205, and a depleted gas channel 206 make up an indirect contact heat exchanger 200. A first refrigerant stream 220 enters and passes up the refrigerant channel 202. A second refrigerant stream 222 enters and passes up the refrigerant channel 203. A third refrigerant stream 224 enters and passes up the refrigerant channel 204. A fourth refrigerant stream 226 enters and passes up the refrigerant channel 205. The number of refrigerant channels illustrated is as a non-limiting example only, and an alternative number may be used.

A depleted gas stream 210 enters and passes up the depleted gas channel 206. A methanol liquid stream 214, acting as the contact liquid, enters and passes down the process channel 201. The methanol liquid stream 214 is of sufficient volumetric flow to wet the surface of the process channel 201 but not to fill the entire process channel 201. A flue gas stream 216 passes up the balance of the volume of the process channel 201. Heat and mass exchange occurs between the flue gas stream 216 and the methanol liquid stream 214. For mass exchange, essentially all of the water vapor from the flue gas stream 216 condenses into the contact liquid stream 214. For heat exchange, in a most preferred embodiment, a heat stream is transferred from the flue gas stream 216 into the methanol liquid stream 214 and the same amount of heat is transferred from the methanol liquid stream 214 into the refrigerant streams 220, 222, 224, and 226 and the depleted gas stream 210, resulting in the methanol liquid stream 214 staying isothermal across the entire process channel 201. The heat and mass exchange results in a dry flue gas stream 217, an enriched contact liquid stream 215, warmed refrigerant streams 213, 221, 223, and 225, and a warmed depleted gas stream 211. The benefit of having multiple refrigerant streams is that the temperature of the methanol liquid stream 214 is controlled by having each section of refrigerant enter at a temperature and flow rate to keep the methanol liquid stream 214 isothermal. With this design, control can be increased in granularity by having more refrigerant channels at their own temperature and flow rates. In a preferred embodiment, the dry gas stream 217 becomes the depleted gas stream 210.

In a preferred version of this embodiment, the flue gas stream 216 is cooled to a temperature below the frost point of the water vapor, resulting in the essentially all of the water vapor condensing out of the flue gas stream 216. In a preferred embodiment, essentially all of the water vapor is 99% of the water vapor in the flue gas stream 216. In a more preferred embodiment, essentially all of the water vapor is 99.9% of the water vapor in the flue gas stream 216. In a most preferred embodiment, essentially all of the water vapor is 99.99% of the water vapor in the flue gas stream 216.

In one embodiment, the methanol liquid stream 214 consists entirely of methanol. In a preferred embodiment, the methanol liquid stream 214 consists of a mix of methanol and ethanol. In some embodiments, the methanol liquid stream 214 contains some water at the entrance to the process channel 201. In one embodiment, the methanol liquid stream enters the process channel 201 saturated in carbon dioxide such that isothermal operation means no carbon dioxide dissolves from the flue gas stream 216 into the methanol liquid stream 214.

In another embodiment, the contact liquid stream 214 consists entirely of ethanol.

Figure 3:
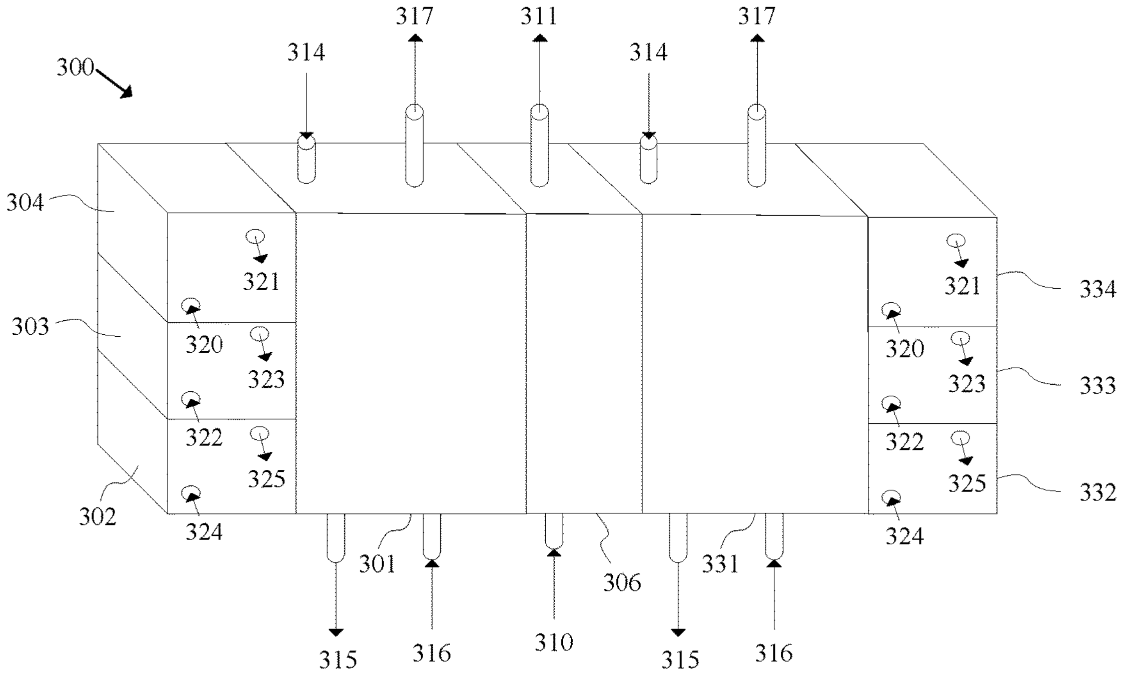
FIG. 3 is an isometric block flow diagram showing part of a heat exchange system for separating a component from a gas stream.

FIG. 3 is an isometric block flow diagram showing part of a heat exchange system for separating a component from a gas stream that may be used in one embodiment of the present invention. This system uses a cooler-dryer exchanger. The cooler-dryer exchanger 300 consists of process channels 301 and 331. The process channel 301 is sandwiched by a depleted gas channel 306 and a stack of refrigerant channels 302, 303, and 304. The process channel 331 is sandwiched by the depleted gas channel 306 and a stack of refrigerant channels 332, 333, and 334. Each process channel has a stack of refrigerant channels on one side and a depleted gas channel on the other side. This repeats as needed.

A first refrigerant stream 320 enters and passes up the refrigerant channels 304 and 334. A second refrigerant stream 322 enters and passes up the refrigerant channels 303 and 333. A third refrigerant stream 324 enters and passes up the refrigerant channels 302 and 332. A depleted gas stream 310 passes up depleted gas channel 306. A contact liquid stream 314 enters and passes down the process channels 301 and 331. The contact liquid stream 314 is of sufficient volumetric flow to wet the inner surface of the process channels 301 and 331 but not to fill the entire process channels. A mixed gas stream 316 contains a first component which is later transferred to the contact liquid stream. The mixed gas stream 316 passes up the center of the contact liquid stream 314. Heat and mass exchange occurs between the flue gas stream 316 and the contact liquid stream 314. For mass exchange, the first component from the flue gas stream 316 condenses into the contact liquid stream 314. A heat stream is transferred from the flue gas stream 316 into the contact liquid stream 314. In one embodiment, the heat stream is split into two portions. A first portion of the amount of heat is transferred from the contact liquid stream 314 into the refrigerant streams 320, 322, and 324 and the depleted gas stream 310. A second portion of the heat stream is retained in the contact liquid stream 314 and raises the temperature of the resultant enriched contact liquid stream 315. The heat and mass exchange results in a depleted gas stream 317, the enriched contact liquid stream 315, warmed refrigerant streams 313, 321, and 323. In a more preferred embodiment, all of the amount of heat is transferred from the contact liquid stream 314 into the refrigerant streams 312, 320, and 324 and depleted gas stream 310, resulting in the contact liquid stream 314 staying isothermal across the entire process channel 301.

Figure 4:
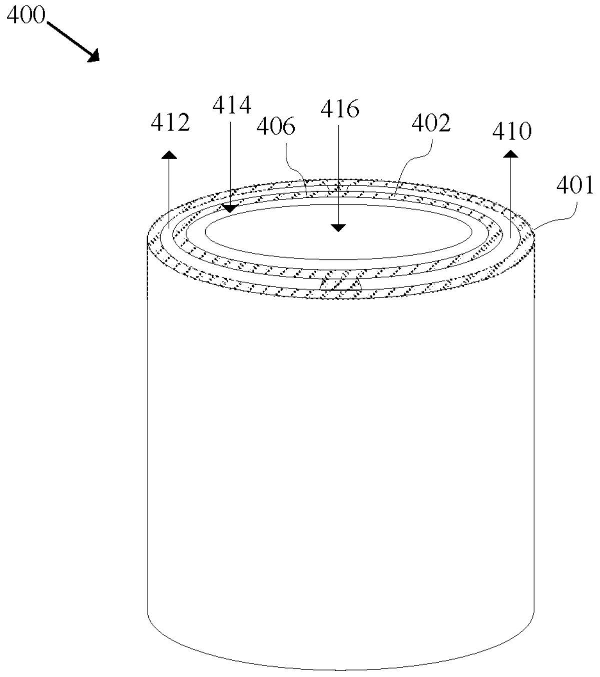
FIG. 4 is an isometric view of a section of a double pipe-in-pipe for separating a component from a gas stream.

FIG. 4 is an isometric view of a section of a double pipe-in-pipe style cooler-dryer exchanger for separating a component from a gas stream that may be used in one embodiment of the present invention. An inner pipe 402 passes through the center of a vertical outer pipe 401, resulting in an outer annular space between outer pipe 401 and inner pipe 402. The outer annular space is split in half, resulting in two annular flow paths. The inner pipe 402 has a cylindrical space inside. A refrigerant stream 412 passes through a first half of the outer annular space. A depleted gas stream 410 passes through a second half of the outer annular space. A contact liquid stream 414 passes down through the cylindrical space such that the contact liquid stream 414 wets the inner wall of the inner pipe 402 in an annular film, leaving an inner space through which a mixed gas stream 416 can pass. The mixed gas stream 416 passes downward through the inner space. In other embodiments, the mixed gas stream 416 passes upward through the inner space. Passing the mixed gas stream 416 and the contact liquid stream 414 against each other causes them to engage in heat and mass exchange. The contact liquid stream 414 receives a heat stream from the mixed gas stream 416 and the first component condenses from the mixed gas stream 416 into the contact liquid stream 414. The contact liquid stream 414 transmits a first portion of the heat stream through the inner pipe 402 into the refrigerant stream 412 and into the depleted gas stream 410. The contact liquid stream 414 retains a second portion of the heat stream as it leaves the inner pipe 402 as an enriched contact liquid stream. The flue gas stream 416 leaves as a depleted gas stream. In another embodiment, the second portion of the heat stream is zero, meaning the first portion of the heat is all of the heat, resulting in the contact liquid stream 414 staying isothermal from the inlet to the outlet of the inner pipe 402. In another embodiment, the second portion of the heat stream is non-zero, resulting in the contact liquid stream 414 increasing or decreasing in temperature from the inlet to the outlet of the inner pipe 402. In some embodiments, the refrigerant gives heat across the inner pipe 402 and provides heat to the contact liquid stream 414, this heat then providing at least the heat of condensation for condensing the first component out of the mixed gas stream.

Figure 5:
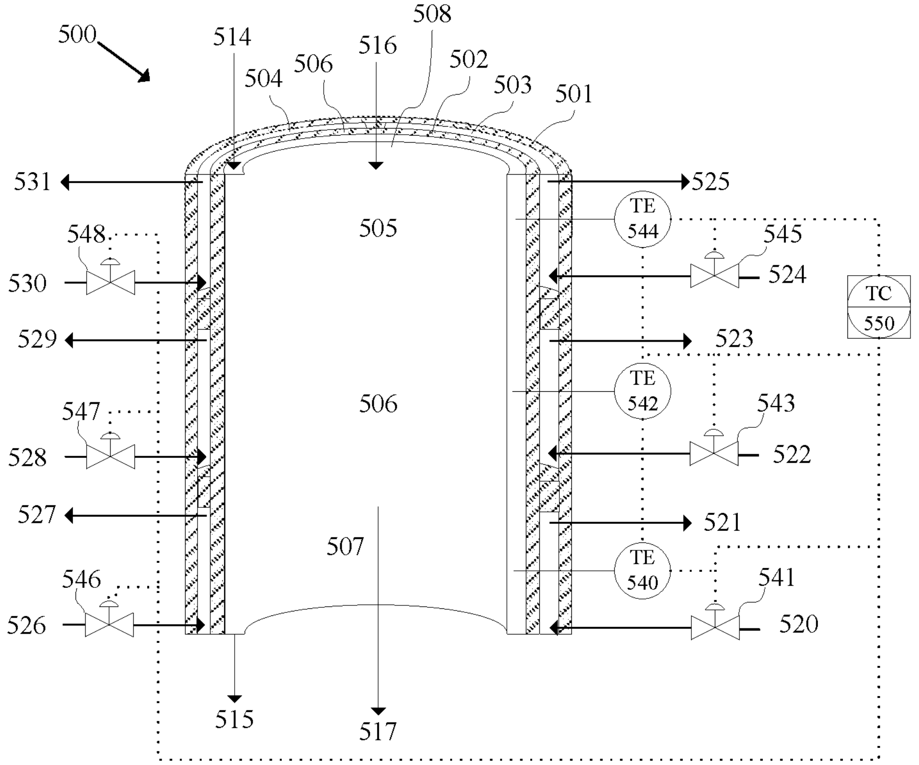
FIG. 5 is a cutaway isometric view of a double pipe-in-pipe showing a system for separating a component from a gas stream.

FIG. 5 is a cutaway isometric view of a double pipe-in-pipe style cooler-dryer exchanger showing a system for separating a component from a gas stream that may be used in one embodiment of the present invention. An inner pipe 502 passes through the center of a vertical outer pipe 501, resulting in an outer annular space 503/504 between outer pipe 501 and inner pipe 502. The outer annular space is split in half, resulting in two annular flow paths 503 and 504. The inner pipe 502 has a cylindrical space inside. The outer annular space 503/504 is physically split into three sections, 505, 506, and 507. The double pipe-in-pipe 500 is an indirect contact heat exchanger and consists of a process channel 508 with three refrigerant and three depleted gas channels, 505, 506, and 507. The depleted gas channels each have depleted gas pass through them as 520, 522, and 524. The refrigerant channels each have a refrigerant that passes through them, 526, 528, and 530. In one embodiment, the depleted gas channels have the same source of gas but flow at different rates to provide different heat exchange. In some embodiments, the refrigerants vary in chemical makeup, temperature, and flow rate. The refrigerant chemical makeup, temperature, and flow rates are chosen to conduct heat exchange across the tube walls at a rate that produces a desired temperature profile in the process channel 501.

The process channel 508 is configured to receive a contact liquid stream 514 through an inlet of the process channel 508 and wet an inner surface of the process channel 508 with the contact liquid stream 514 while leaving a gas space in a center volume of each of the tubes of the process channel 508, similar to FIG. 4. The process channel 508 is further configured to receive the mixed gas stream 516 through the inlet of the process channel 508 and pass the mixed gas stream 516 through the gas space in the center volume of the process channel 508.

The refrigerant channels are configured to each receive refrigerant streams controlled by refrigerant controlling valves 546, 547, and 548 and the depleted gas channels are configured to each receive depleted gas streams controlled by gas controlling valves 541, 543, and 545. In other embodiments, other control elements like pumps could be used. These valves are controlled by a main controller 550. The main controller 550 receives temperature data from temperature elements 540, 542, and 544 that measure the temperature of the contact liquid 514 at points through the process channel 508. In a preferred embodiment, the main controller 550 sends a signal that varies the valves to provide depleted gas and refrigerants at a rate that keeps the temperature profile isothermal. In other embodiments, the temperature profile is maintained to increase or decrease the temperature as the contact liquid 514 passes through the exchanger 500.

The mixed gas stream 516 condenses the first component into the contact liquid stream 514. The mixed gas stream 516 passes a heat stream to the contact liquid stream 514. The contact liquid stream 514 transmits a first portion of the heat stream to the refrigerant and depleted gas streams 520, 522, 524, 526, 528, and 530. The contact liquid stream 516 retains a balance of the heat stream. In a preferred embodiment, the first portion of the heat stream is the entire heat stream and the contact liquid stream 516 stays isothermal.

The result of the heat and mass exchange of FIG. 5 is an enriched contact liquid stream 515, a depleted mixed gas stream 517, warm refrigerant streams 521, 523, and 525, and warm depleted gas streams 527, 529, and 531.

Figure 6:
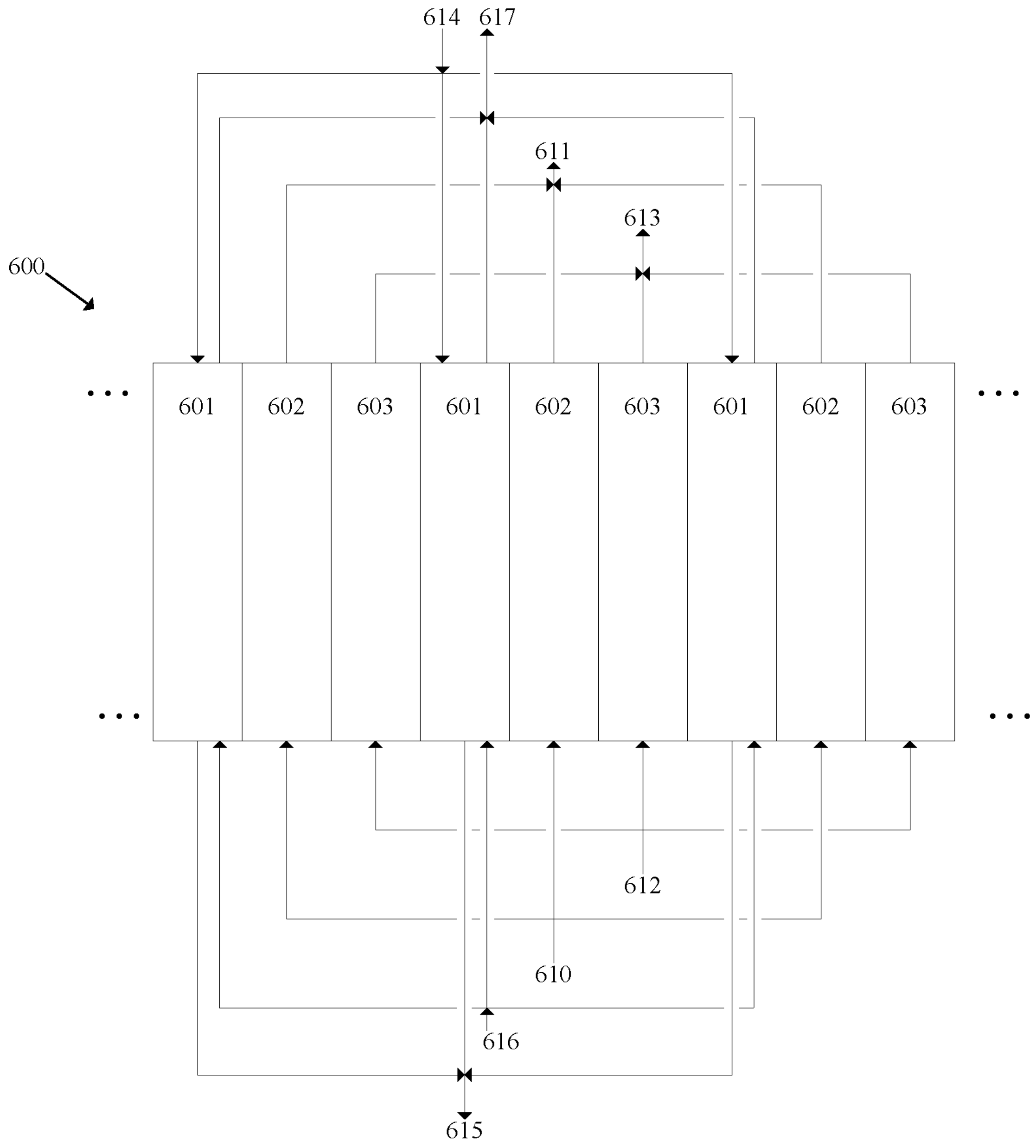
FIG. 6 is a block flow diagram showing a method for separating a component from a mixed gas stream.

FIG. 6 is a block flow diagram showing a method for separating a component from a mixed gas stream that may be used in one embodiment of the present invention. This is referred to as a cooler-dryer exchange process. A refrigerant stream 612 is passed through refrigerant channels 603 of an indirect contact heat exchanger 600. A depleted gas stream 610 is passed through depleted gas channels 602 of the indirect contact heat exchanger 600. A contact liquid stream 614 is passed through process channels 601 of the indirect contact heat exchanger 600. The contact liquid stream 614 wets a first interior wall and a second interior wall of the process channels 601. The first interior wall separates the process channels 601 from the refrigerant channels 603 and the second interior wall separates the process channels 601 from the depleted gas channels 602. The mixed gas stream 616 passes through the centers of the process channels such that the mixed gas stream 616 and the contact liquid stream 614 engage in heat and mass exchange. The contact liquid stream 614 receives a heat stream from the mixed gas stream, transmits a first portion of the heat stream through the first interior wall into the refrigerant stream 612, transmits a second portion of the heat stream through the second interior wall into the depleted gas stream 610, and leaves the process channel 601 while retaining a balance of the heat stream. The first component condenses from the mixed gas stream 616 into the contact liquid stream 614, resulting in a depleted gas stream 617 and an enriched contact liquid stream 615.

In some embodiments, the first portion of the heat stream and the second portion of the heat stream are all of the heat stream, causing the contact liquid stream 614 to be isothermal throughout the process channel 601.

In another embodiment, the balance of the heat stream is positive, causing the contact liquid stream 614 to increase in temperature from an inlet of the process channel 601 to an outlet of the process channel 601.

In another embodiment, the balance of the heat stream is positive, causing the contact liquid stream 614 to decrease in temperature from an inlet of the process channel 601 to an outlet of the process channel 601.

In some embodiments, the mixed gas stream 616 is selected from a group consisting of flue gas, natural gas, liquefied petroleum gas, and syngas.

In a preferred embodiment, the first component comprises water. In some embodiments, the mixed gas stream further contains a second component that is an acid gas selected from the group consisting of carbon dioxide, sulfur oxides, nitrogen oxides, mercury, mercury oxides, carbon monoxide, other pollutants, and a combination thereof.

In some embodiments, the contact liquid stream is selected from the group consisting of water, isopentane, methanol, ethanol, and a combination thereof.

In some embodiments, the refrigerant stream is counter current to the contact liquid stream.

In some embodiments, the refrigerant stream is a liquid and contains a light component. The method further consists of vaporizing a portion of the light component in the third channel. In some embodiments, the refrigerant stream includes isopentane and the light component comprises propane or butane.

Figure 7:
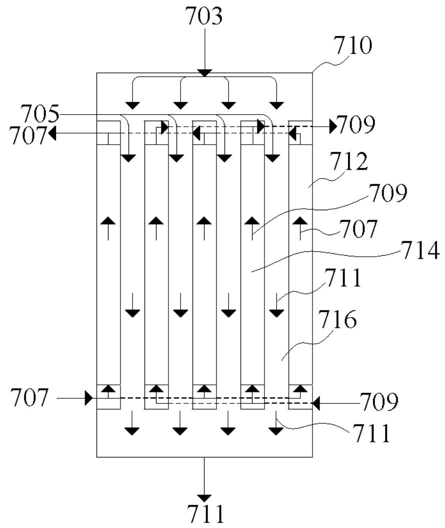
FIG. 7 is a process flow diagram showing a cooler-dryer exchanger that may be used in FIGS. 1, 2, and 3.
Figure 8:
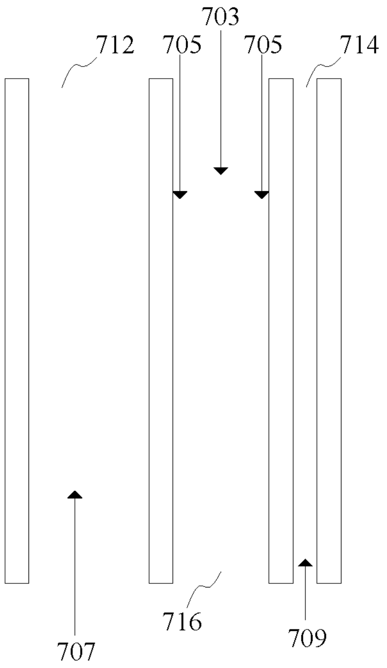
FIG. 8 is a process flow diagram showing a close-up of the exchanger of FIG. 7.

FIG. 7 is a process flow diagram showing a cooler-dryer exchanger that may be used in FIGS. 1, 2, and 3. FIG. 8 is a process flow diagram showing a close-up of the exchanger of FIG. 7. The cooler-dryer exchanger 710 has first channels 716, second channels 712, and third channels 714. A first contact liquid stream 705 is passed into the first channels 716 such that the first contact liquid stream 705 wets the walls of the first channels 716, leaving an open space inside the first channels 716. A gas stream 703, containing carbon dioxide and water, is passed down into the open space inside the first channels 716, the gas stream 703 and the first contact liquid stream 705 thereby conducting heat and mass exchange co-currently in the first channels 716, condensing the water into the first contact liquid stream 705 and cooling the gas stream 703 to below −95° C., resulting in a dry gas stream and a wet contact liquid stream 711. The second channels 712 contain a depleted dry gas stream 707 and are used to indirectly cool the first channels 716. The third channels 714 contain a first refrigerant 709 and are used to indirectly cool the first channels 716.

The invention has been described with reference to various specific and preferred embodiments and techniques. Nevertheless, it is understood that many variations and modifications may be made while remaining within the spirit and scope of the invention.

What is claimed is:

1. A method for removing a first component from a mixed gas stream comprising:

passing a refrigerant stream through a first channel of an indirect contact heat exchanger;

passing a depleted gas stream through a second channel of the indirect contact heat exchanger;

passing a contact liquid stream through a third channel of the indirect contact heat exchanger such that the contact liquid stream wets at least a portion of a first interior wall and a second interior wall of the third channel, wherein the first interior wall separates the first channel from the third channel and the second interior wall separates the second channel from the third channel; and passing the mixed gas stream through a center of the third channel such that the mixed gas stream and the contact liquid stream engage in heat and mass exchange;

wherein the contact liquid stream:

receives a heat stream from the mixed gas stream;

transmits a first portion of the heat stream through the first interior wall into the refrigerant stream;

transmits a second portion of the heat stream through the second interior wall into the depleted gas stream; and leaves the third channel while retaining a balance of the heat stream;

wherein the first component condenses from the mixed gas stream into the contact liquid stream, resulting in a depleted gas stream and an enriched contact liquid stream.

2. The method of claim 1, wherein a ratio of the contact liquid stream to the first component in the third channel is sufficiently high that the first component does not freeze in the contact liquid stream.

3. The method of claim 2, wherein the contact liquid stream is hydrophobic.

4. The method of claim 1, wherein the first portion of the heat stream and the second portion of the heat stream are all of the heat stream, causing the contact liquid stream to be isothermal throughout the third channel.

5. The method of claim 1, wherein the balance of the heat stream is positive, causing the contact liquid stream to increase in temperature from an inlet of the third channel to an outlet of the third channel.

6. The method of claim 1, wherein the balance of the heat stream is negative, causing the contact liquid stream to decrease in temperature from an inlet of the third channel to an outlet of the third channel.

7. The method of claim 1, wherein the mixed gas stream is selected from a group consisting of flue gas, natural gas, liquefied petroleum gas, and syngas.

8. The method of claim 1, wherein the first component comprises water.

9. The method of claim 8, wherein the mixed gas stream further comprises a second component comprising acid gases selected from a group consisting of carbon dioxide, sulfur oxides, nitrogen oxides, mercury, mercury oxides, carbon monoxide, other pollutants, and a combination thereof.

10. The method of claim 1, wherein the contact liquid stream is selected from a group consisting of water, isopentane, methanol, ethanol, and a combination thereof.

11. The method of claim 1, wherein the refrigerant stream is counter current to the contact liquid stream.

12. The method of claim 1, wherein the refrigerant stream is a liquid and comprises a light component and the method further comprising vaporizing a portion of the light component in the third channel.

13. A system for removing a first component from a mixed gas stream comprising:

an indirect contact heat exchanger comprising a process channel, one or more refrigerant channels, and one or more depleted gas stream channels, the process channel sharing a first interior wall with the one or more refrigerant channels and a second interior wall with the one or more depleted gas stream channels;

the process channel configured to receive a contact liquid stream through an inlet of the process channel and wet inner surfaces of the first interior wall and the second interior wall of the process channel with the contact liquid stream while leaving a gas space inside the process channel;

the process channel further configured to receive the mixed gas stream through the inlet of the process channel and pass the mixed gas stream through the gas space;

the one or more refrigerant channels configured to each receive one of a group of refrigerant streams from one or more refrigerant controllers;

one or more instruments situated at least on the inlet of the process channel, an outlet of the process channel, or both;

the one or more instruments configured to measure one or more process variables of the process channel and transmit the one or more process variables to a main controller;

the main controller programmed to receive the one or more process variables and send a signal to each of the one or more refrigerant controllers;

the one or more refrigerant controllers configured to control a flow rate of one of the group of refrigerant streams to each of the one or more refrigerant channels to maintain the one or more process variables in the contact liquid stream at a setpoint; and wherein the contact liquid stream:

receives a heat stream from the mixed gas stream;

transmits a first portion of the heat stream to each of the group of refrigerant streams in each of the one or more refrigerant channels;

transmits a second portion of the heat stream to the depleted gas stream channels; and leaves the process channel while retaining a balance of the heat stream;

wherein the first component condenses from the mixed gas stream into the contact liquid stream.

14. The system of claim 13, wherein the first portion of the heat stream and the second portion of the heat stream are all of the heat stream, causing the contact liquid stream to be isothermal throughout the process channel.

15. The system of claim 13, wherein the mixed gas stream is selected from a group consisting of flue gas, natural gas, liquefied petroleum gas, and syngas.

16. The system of claim 13, wherein the first component comprises water.

17. The system of claim 16, wherein the mixed gas stream further comprises a second component comprising acid gases selected from a group consisting of carbon dioxide, sulfur oxides, nitrogen oxides, mercury, mercury oxides, carbon monoxide, other pollutants, and a combination thereof.

18. The system of claim 13, wherein the contact liquid stream is selected from a group consisting of water, isopentane, methanol, ethanol, and a combination thereof.

19. The system of claim 13, wherein the group of refrigerant stream is counter current to the contact liquid stream.

20. The system of claim 13, wherein one of the group of refrigerant streams is a liquid and comprises a light component and a portion of the light component is vaporized in the process channel.

* * * * *